United States Patent
Nespor

(10) Patent No.: US 8,043,040 B2
(45) Date of Patent: Oct. 25, 2011

(54) CARGO HANDLING APPARATUS AND UNDERRIDE COMBINATION

(76) Inventor: Ronald R. Nespor, Osprey, FL (US)

( * ) Notice: Subject to any disclaimer, the term of this patent is extended or adjusted under 35 U.S.C. 154(b) by 277 days.

(21) Appl. No.: 12/508,246

(22) Filed: Jul. 23, 2009

(65) Prior Publication Data

US 2009/0285661 A1 Nov. 19, 2009

Related U.S. Application Data

(63) Continuation-in-part of application No. PCT/US2008/078345, filed on Sep. 30, 2008, and a continuation-in-part of application No. 11/981,345, filed on Oct. 31, 2007, now Pat. No. 7,568,877.

(51) Int. Cl.
*B60P 1/00* (2006.01)
(52) U.S. Cl. .................................. 414/545; 414/401
(58) Field of Classification Search .............. 414/545, 414/556, 557, 401, 546; 296/26.01, 26.12, 296/26.13
See application file for complete search history.

(56) References Cited

U.S. PATENT DOCUMENTS

| | | | |
|---|---|---|---|
| 586,641 A * | 7/1897 | Underwood | 414/541 |
| 2,621,814 A | 12/1952 | Lisota | |
| 2,774,494 A * | 12/1956 | Malmstrom | 414/546 |
| 3,174,634 A * | 3/1965 | Peck | 414/541 |
| 3,430,792 A | 3/1969 | Grove et al. | |
| 3,450,282 A | 6/1969 | Ezolt | |
| 3,485,400 A | 12/1969 | Pewthers | |
| 3,520,426 A * | 7/1970 | Hostetler | 414/545 |
| 3,776,402 A * | 12/1973 | Bryan | 414/545 |
| 3,830,384 A * | 8/1974 | Barber | 414/556 |
| 4,081,094 A | 3/1978 | Pereira et al. | |
| 4,252,491 A * | 2/1981 | Hock | 414/540 |
| 4,318,657 A | 3/1982 | Znidaric | |
| 4,578,014 A | 3/1986 | Colet | |
| 4,702,662 A | 10/1987 | Marlett | |
| 4,704,062 A | 11/1987 | Hale | |
| 4,795,303 A | 1/1989 | Bubik | |
| 4,842,470 A | 6/1989 | Hubbard | |
| 4,875,822 A | 10/1989 | Nespor | |
| 4,929,142 A | 5/1990 | Nespor | |
| 4,930,969 A * | 6/1990 | Langer | 414/540 |
| 5,006,033 A | 4/1991 | McConnell | |
| 5,061,147 A | 10/1991 | Nespor | |
| 5,092,721 A * | 3/1992 | Prince | 410/26 |
| 5,176,486 A * | 1/1993 | Park | 414/472 |
| 5,246,329 A | 9/1993 | Farrell | |
| 5,249,909 A | 10/1993 | Roberts et al. | |
| 5,370,493 A * | 12/1994 | Oshima | 414/556 |

(Continued)

*Primary Examiner* — Joshua Rudawitz
(74) *Attorney, Agent, or Firm* — Gold & Rizvi, P.A.; Glenn E. Gold; H. John Rizvi

(57) ABSTRACT

A goods handling' apparatus for a cargo storage and transport vehicle includes a movable cargo platform continuous with a portion of cargo enclosure floor, when the cargo platform is in an upper position. Cargo may be slid between the trailer floor and the cargo platform. A vertical actuator raises and lowers the cargo platform between the upper position and a lower position atop the ground or other vehicle support surface whereupon cargo may be slid between the cargo platform and the ground or other positions. The cargo platform is disposed substantially within the plan perimeter of the floor of the cargo module during raising and lowering. A modular system may be integrated into the cargo enclosure, or may be incorporated into a modular enclosure for appending to a cargo box of the prior art. An underride is disposed in vertically adjusting communication with the cargo platform.

17 Claims, 9 Drawing Sheets

U.S. PATENT DOCUMENTS

| | | | |
|---|---|---|---|
| 5,529,454 A | 6/1996 | Alm et al. | |
| 5,720,526 A | 2/1998 | Roberts | |
| 5,779,431 A | 7/1998 | Alm et al. | |
| 5,829,947 A * | 11/1998 | Litten | 414/537 |
| 5,984,614 A | 11/1999 | Weber | |
| 6,019,567 A * | 2/2000 | Lutkus et al. | 414/549 |
| 6,071,064 A * | 6/2000 | Hackett | 414/545 |
| RE36,805 E * | 8/2000 | Kempf | 414/545 |
| 6,234,740 B1 * | 5/2001 | Page | 414/545 |
| 6,276,890 B1 | 8/2001 | Pratt | |
| 6,336,783 B1 | 1/2002 | Young et al. | |
| 6,354,785 B2 | 3/2002 | Maeno | |
| 6,461,096 B1 | 10/2002 | Mentele et al. | |
| 6,666,643 B1 * | 12/2003 | Heynssens | 414/542 |
| 7,401,860 B2 | 7/2008 | Kraenzle | |
| 7,556,467 B2 * | 7/2009 | Ablabutyan et al. | 414/557 |
| 7,762,756 B1 * | 7/2010 | Ablabutyan et al. | 414/556 |
| 7,931,433 B2 * | 4/2011 | Ablabutyan et al. | 414/557 |
| 2005/0058528 A1 * | 3/2005 | Wroblewski | 414/545 |

* cited by examiner

CARGO HANDLING APPARATUS AND UNDERRIDE COMBINATION

CROSS-REFERENCE TO RELATED APPLICATIONS

This is a Continuation-In-Part application that claims the benefit of PCT International Application Serial No. PCT/US2008/078345, filed on Sep. 30, 2008, and U.S. application Ser. No. 11/981,345, filed Oct. 31, 2007, now U.S. Pat. No. 7,568,877 with the United States Patent & Trademark Office, which are hereby incorporated by reference herein in their entirety. If any national office does not provide for incorporation by reference in its entirety, at least the additional subject matter not included in this application directly is incorporated by reference herein.

FIELD OF THE INVENTION

The field relates to delivery trucks with lifts to raise and lower cargo to and from an enclosure mounted on the chassis of a cargo truck.

BACKGROUND OF THE INVENTION

While lifts are known that extend off the back of a truck by folding down or by arcuately extending outward and down from the back of a truck. These lifts fail to provide for use when space behind a truck is limited, are bulky additions to the truck, and do not provide additional floor space while enclosing the lift components within the enclosure of the cargo area.

Typically, trailers and vehicles with a trailer or enclosure for hauling cargo are arranged to haul cargo within the trailer and atop a trailer floor. One such arrangement is found in a delivery truck, which includes a vertically movable lift gate, which swings down and extends rearwardly from the end of the trailer floor. Cargo is either loaded onto or off the rear lift gate and either elevated or lowered for pick up or delivery of the cargo. However, in inclement weather, the operator and the cargo may be exposed to rain or snow by being outside of the confines of the trailer. Moreover, extra room behind the, trailer-is required to accommodate the length of the lift gate and additional space to load and unload cargo therefrom.

A number of prior art systems have been developed which, in part, address this limiting aspect of the above delivery trucks. U.S. Pat. No. 4,236,747 issued Dec. 2, 1980 to Ratliff discloses a transport vehicle for medium-sized route delivery of goods. The versatile design allows for removability of the central partition in each cargo bay and adjustability of the position of the floor. A delivery truck body or trailer, which is convertible between being arranged for side loading at ground level or rear loading at dock height, is disclosed in U.S. Pat. No. 4,659,132 to Day.

Price teaches a double drop trailer with lifts therein in U.S. Pat. No. 5,092,721. A first lift comprises upper and lower platforms rigidly interconnected one to another, the second lift located in the rear section.

Three U.S. patents to Greenlaw, et al., U.S. Pat. Nos. 5,915, 913, 6,328,525 and 6,474,446, teach delivery vehicles with multi-tier storage and elevator assemblies installed therein. Substantially continuous side access door provide total exterior access to the lowermost tier of cargo in the '525 patent, the '913 patent teaching elevator assemblies for multi-tier storage. The '446 patent teaches a framing system that reduces structural requirements of side walls and floors, permitting multiple Side access ports and reduced floor thickness to permit easier access from the pavement.

Recently issued U.S. Pat. No. 7,114,905 to Dibdin teaches methods and an apparatus for optimizing use of storage space in a trailer. The apparatus provides a loading apparatus for the trailer having a platform movable relative to the floor of the trailer to facilitate loading of goods.

Published application 2003/0147734 to Adams discloses a goods handling system for a vehicle or railway trailer which allows the level of access to all areas of the trailer to be improved.

An under ride is a cross member positioned below a vehicle trailer and the ground, providing a safety barrier which keeps other vehicles from encroaching under the vehicle.

Federal Motor Vehicle Safety Standard No. 224, Rear Impact Protection, requires most trailers and semi-trailers weighing over 10,000 pounds to be fitted at the rear with a rear impact (underride) guard meeting the requirements of Standard No. 223, Rear impact guards (49 CFR 571.223 and 571.224) published on Jan. 24, 1996 at 61 FR 2004).

Concerns were expressed about compatibility of underrides in conjunction with trailers and semi-trailers equipped with equipment such as liftgates. Concerns about certain incompatible equipment led NHTSA to exclude "special purpose vehicles" from the requirements of the standard. A special purpose vehicle is defined in 84 of Federal Motor Vehicle Safety Standard No. 224 as, "a trailer or semi-trailer having work-performing equipment that, while the vehicle is in transit, resides in or moves through the area that could be occupied by the horizontal member of the rear underride guard, as defined by S5.1.1 through S5.1.3. If any work-performing equipment is mounted in the guard zone, the vehicle is excluded regardless of when and how the equipment is used.

Underrides are valuable safety devices that are excluded on trailers or semi-trailers that include equipment such as liftgates. An underride design that is compatible with equipment such as liftgates is desired.

None of the known lifts provide vertically movable cargo within the confines of a trailer enclosure. Additional space is required rearwardly of the trailer for most of the known systems. Additionally, movable side cargo-receiving lifts are capable of being used for floor space for hauling Cargo.

BRIEF SUMMARY OF THE INVENTION

A goods handling apparatus for a cargo storage and transport trailer includes a movable cargo platform module forming a separate part of the trailer floor that may be continuous with the trailer floor when the cargo platform is in an upper position, and cargo may be slid between the trailer floor and the cargo platform or may remain on the platform during hauling of the cargo to a destination. A vertical actuator attached to the cargo platform raises and lowers the cargo platform between the upper position and a lower position atop the ground or other vehicle support surface or loading dock. Cargo may be slid or rolled off the platform without lifting between the cargo platform and the ground or other surface. The cargo platform is positioned substantially' within the plan perimeter of the floor of the trailer during lifting and lowering, allowing cargo to be loaded or off-loaded in tight confines not possible with known lifts.

An illustrative embodiment of the cargo storage and transport trailer includes:

a continuous, flat cargo-supported floor surface within an enclosed storage area;

a movable cargo platform forming a separate continuation of the floor surface and being generally continuous with the floor surface when said cargo platform is in an upper position whereby cargo may be slid between the trailer-floor surface and said cargo platform;

a vertical actuator attached at one end to said cargo platform and coupled to the enclosed storage area such that the vertical actuator raises and lowers said cargo platform between the upper position and a lower position atop the ground or other surface supporting the delivery truck, wherein cargo may be slid between said cargo platform and the ground or other surface supporting the delivery truck, and said cargo platform being substantially within a perimeter of the trailer floor when cargo on said cargo platform is lifted or lowered and said vertical actuator being within the enclosed storage area when said cargo platform is in the upper position and outside of the enclosed storage area when said cargo platform is in the lower position atop the ground or other surface supporting the delivery truck.

In one aspect, the cargo storage and transport trailer further includes an underride positioned spanning across a rear edge of the trailer and below a lift. The underride being vertically compensating via a biasing member.

In yet another aspect, the cargo handling apparatus may be incorporated into a conventional delivery trailer of a truck, which will lift and lower cargo within the confines of the trailer. In one example, the platform is confined to the perimeter of a module that may be modularly coupled with the truck. In one example, a modular lift extends from side of the truck allowing the lift to clear the chassis of the truck.

In yet another aspect, rear impact protection is provided by an integrated cross member that is capable of lowering and rising with the lift mechanism integrated into the rear of enclosure. In one advantage, goods handling apparatus may eliminate the need for additional working space behind or to the rear of the trailer of the vehicle by deploying and lifting a vertically movable cargo platform which is positioned within a rearward opening formed into the floor of the trailer floor and within the plan profile of the trailer (e.g. the perimeter of the enclosed area).

While in another aspect, a goods handling apparatus which extends laterally from the side of a trailer only a distance sufficient for a cargo platform to move vertically just outboard of the frame of the trailer provides for raising and lowering within the perimeter of the goods handling apparatus module.

And in another aspect, a second underride is disposed beneath the side located cargo platform. The underride being vertically compensating via a biasing member. The underride is supported via an upright frame, which slideably engages with an upright receiving channel. The biasing member is secured between the upright receiving channel and the upright frame member.

Figure 1:
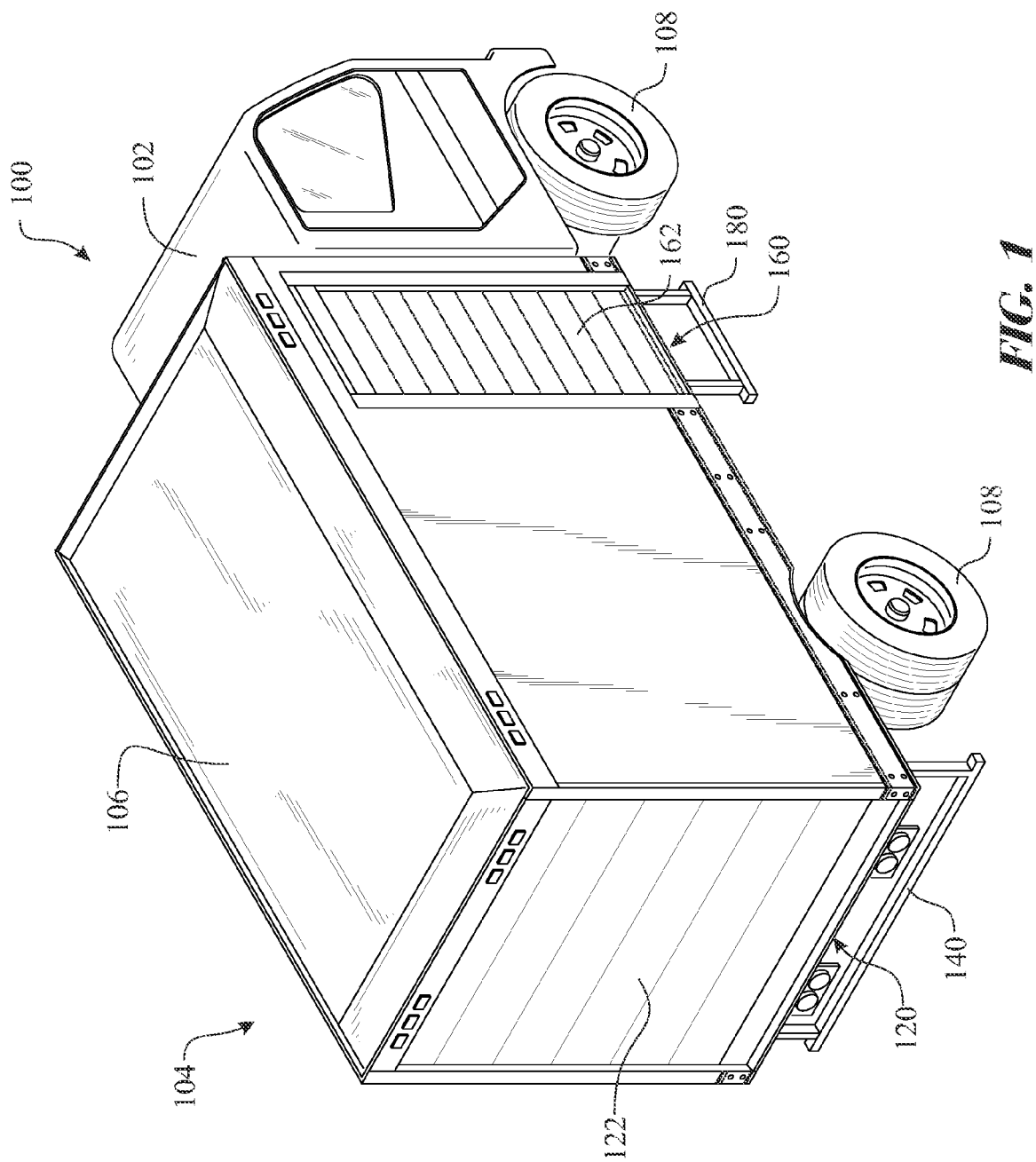
FIG. 1 is a perspective view of a cargo vehicle showing several embodiments of the invention view of FIG. 1.
Figure 2:
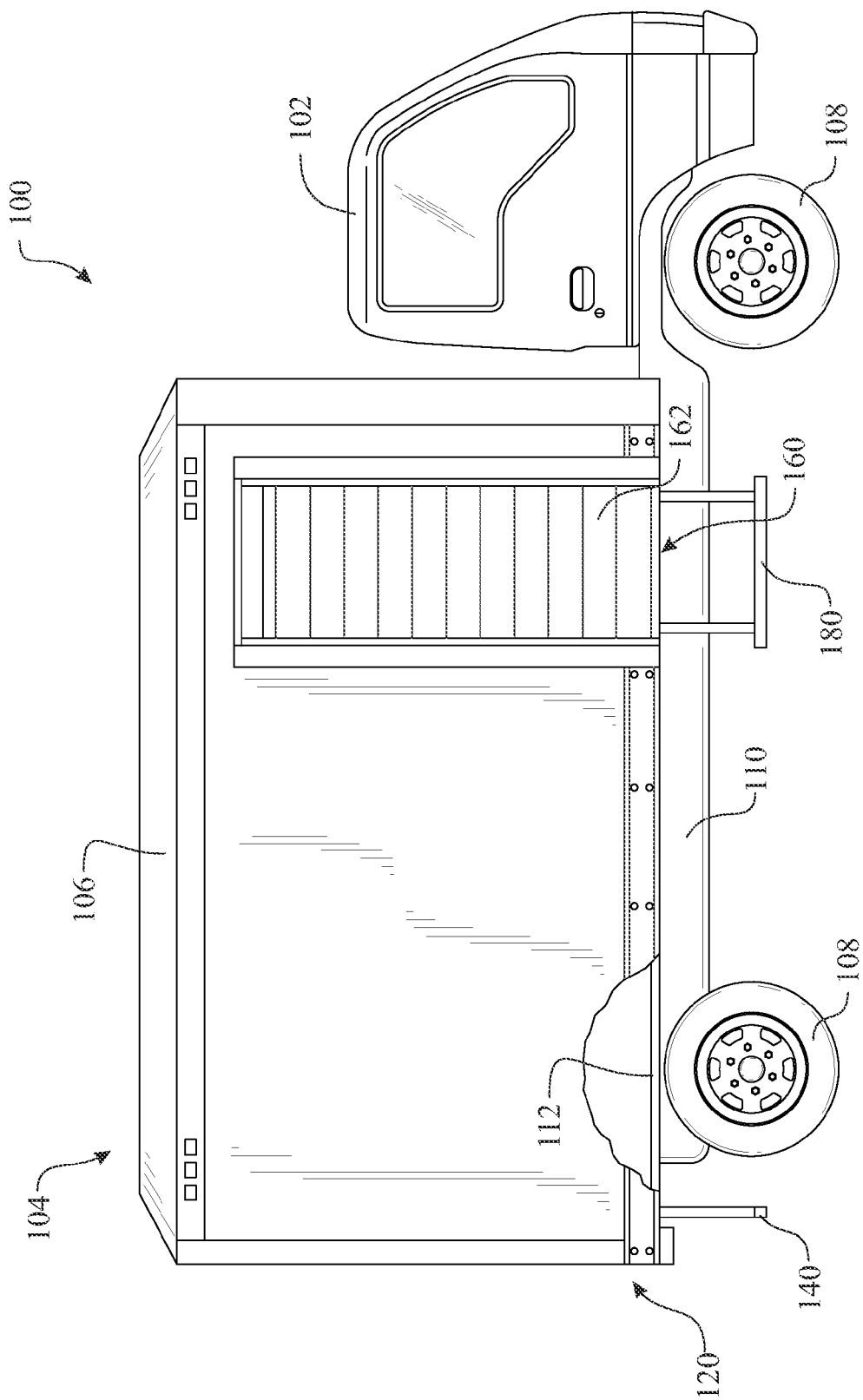
FIG. 2 is a side elevation view of the cargo vehicle of FIG. 1.
Figure 3:
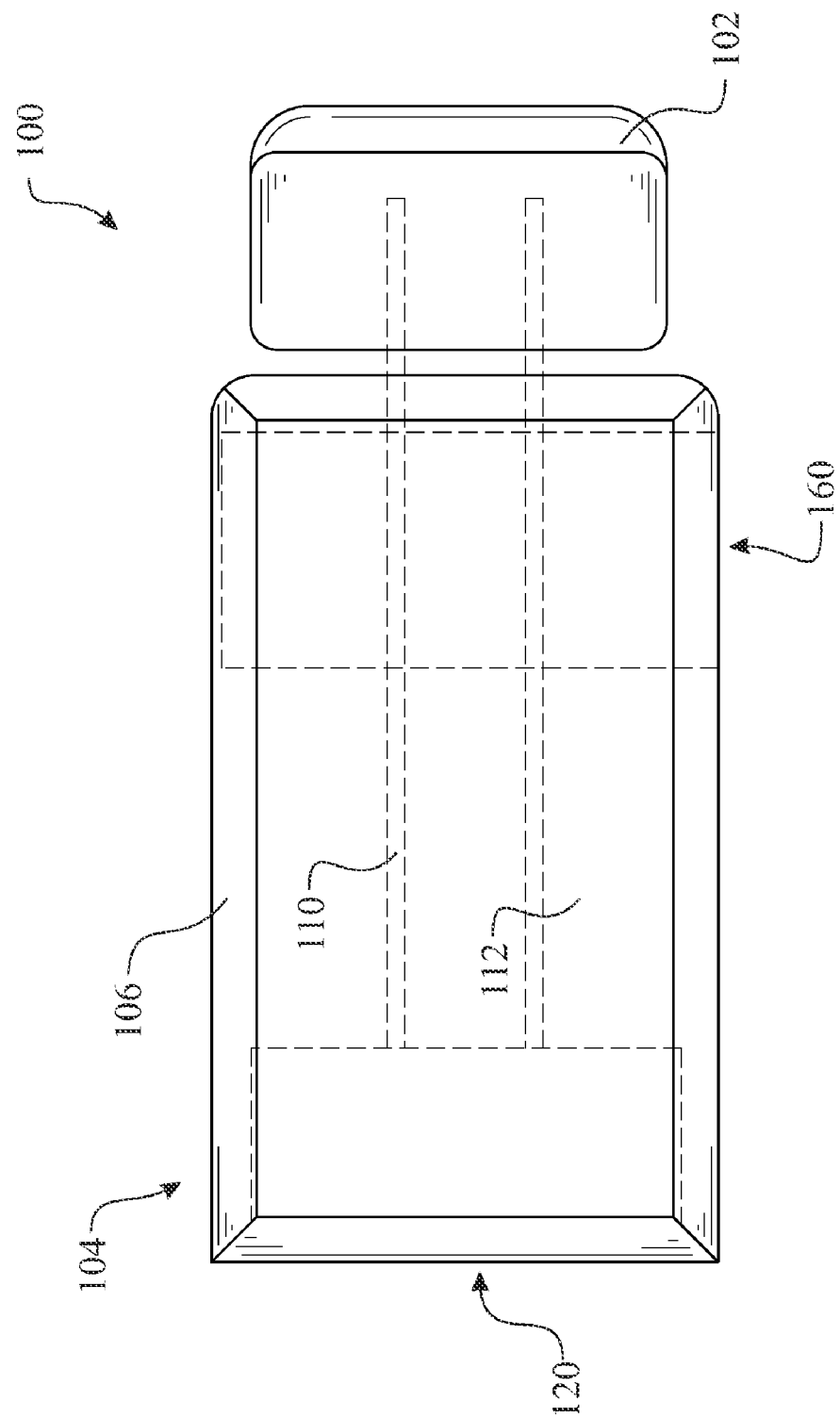
FIG. 3 is a top plan view of the cargo vehicle of FIG. 1.

Examples are illustrated in the drawings and are described herein. It is intended that the embodiments and figures disclosed herein are to be considered to be illustrative rather than limiting.

DETAILED DESCRIPTION OF THE PREFERRED EMBODIMENTS

A cargo storing and transport vehicle 100 is presented illustrating various elements contributing to the present invention, which are described in FIGS. 1 through 9. Referring now to the drawings, an otherwise cargo storing and transport vehicle 100 is shown and includes a truck 102 and a trailer assembly 104. A trailer assembly 104 includes a trailer body 106 defining an enclosure above a trailer floor 112 and having a longitudinal trailer frame 110, which may be formed as an integral part of the truck 102.

Two examples of integrated lift platforms 120, 160 are illustrated. The examples may be combined in a single trailer assembly 104 or may be used separately. In one example, a movable rear cargo platform 124 is rectangular, but may be of any convenient shape or size and may have a tapered lip or ramp 126 along the rearwardly distal edge, for example. This example includes a pair of rear upright frame members 130 rigidly connected at each rearwardly corner of the movable rear cargo platform 124 or at least within the enclosure when the platform is raised. Each are upwardly engaged into one of two vertical actuator channels 132 and operated via a respective vertical actuator 134. These vertical actuator channels 132 may be rigidly attached or affixed to an inner surface of the trailer body 106 or an intermediate support in an upright orientation within the enclosure of the trailer body 106. Functionality of the lift 120, 160 is best described in FIGS. 9 and 10 disclosed herein.

The trailer floor 112 includes a rear platform floor cutout 114, which may be formed in the distal rearward portion of the trailer floor 112. The opening substantially mates with and receives the movable rear cargo platform 124 so that, when the movable rear cargo platform 124 is in the upper position, top-most surface of the movable rear cargo platform 124 is substantially continuous with and uninterrupting of the movable rear cargo platform 124 so that cargo within the trailer body 106 may be slid onto or from the movable rear cargo platform 124 without the need for lifting or use of a wheeled cart or hand truck, for example.

Figure 4:
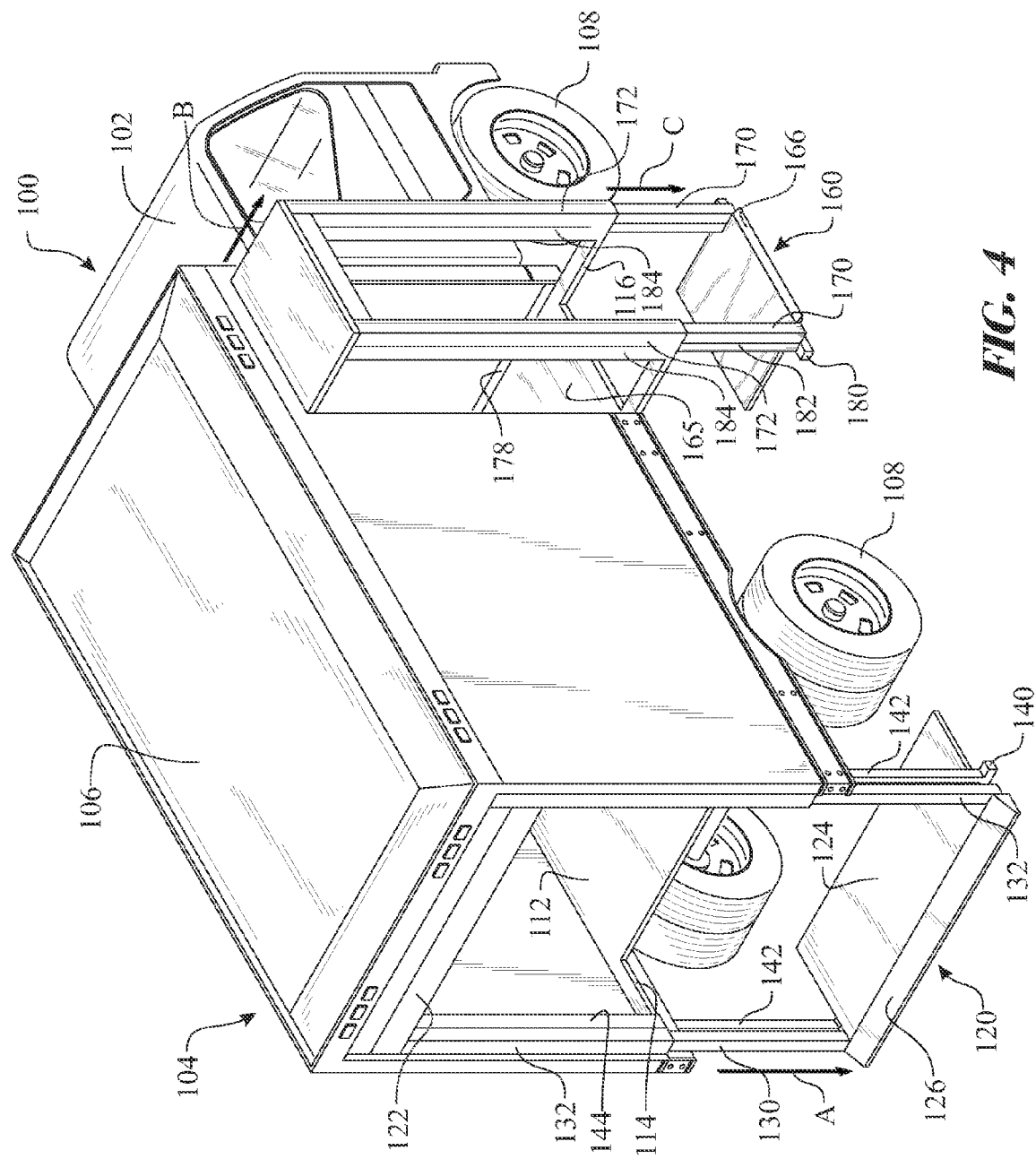
FIG. 4 is another perspective view of the cargo vehicle of FIG. 1 showing several embodiments of the invention in a deployed configuration.
Figure 5:
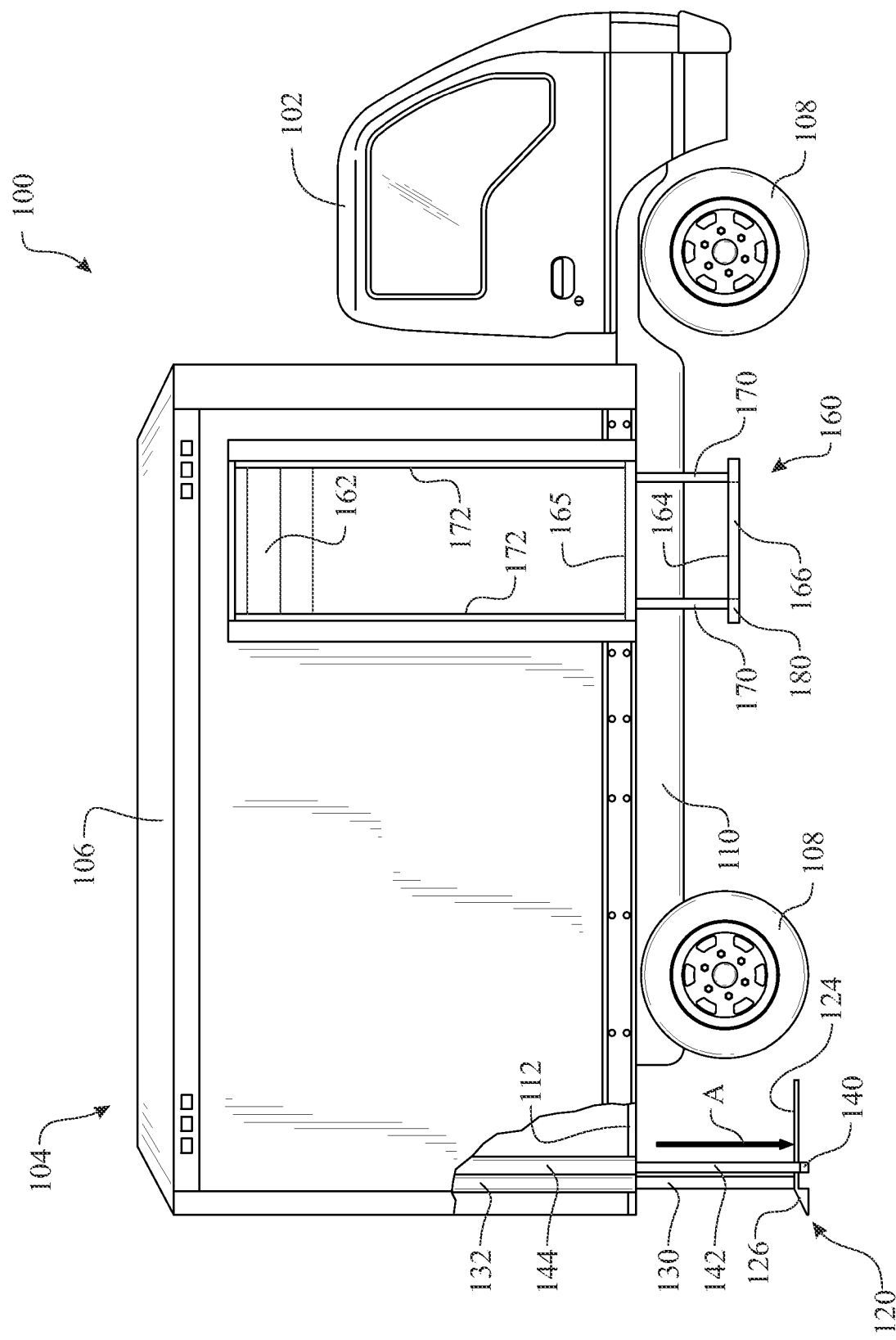
FIG. 5 is a side elevation view of the cargo vehicle illustrating the two cargo lifts in a partially lowered configuration.
Figure 6:
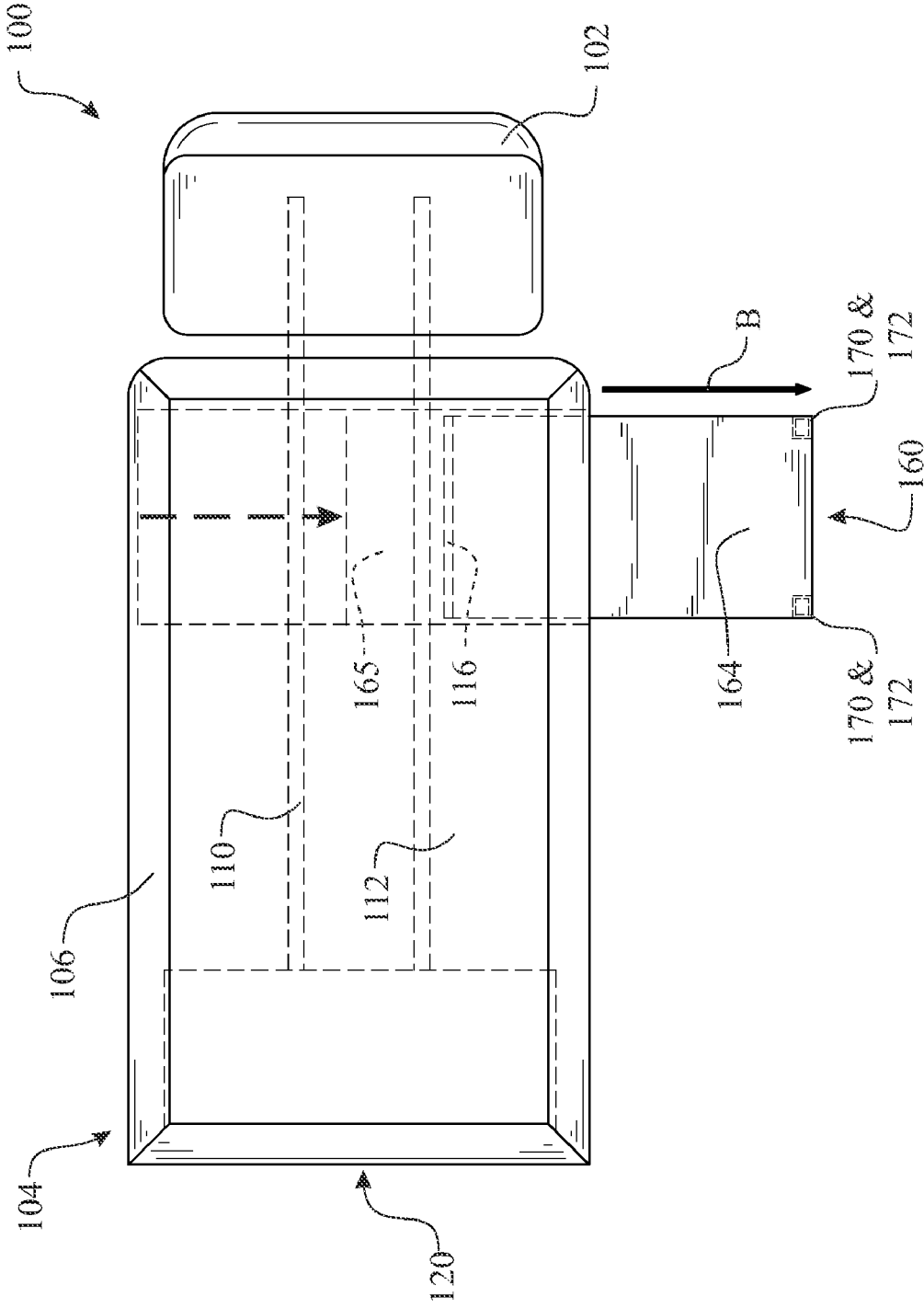
FIG. 6 is a top plan view of the cargo vehicle illustrating a side cargo lifting platform in a deployed configuration.
Figure 7:
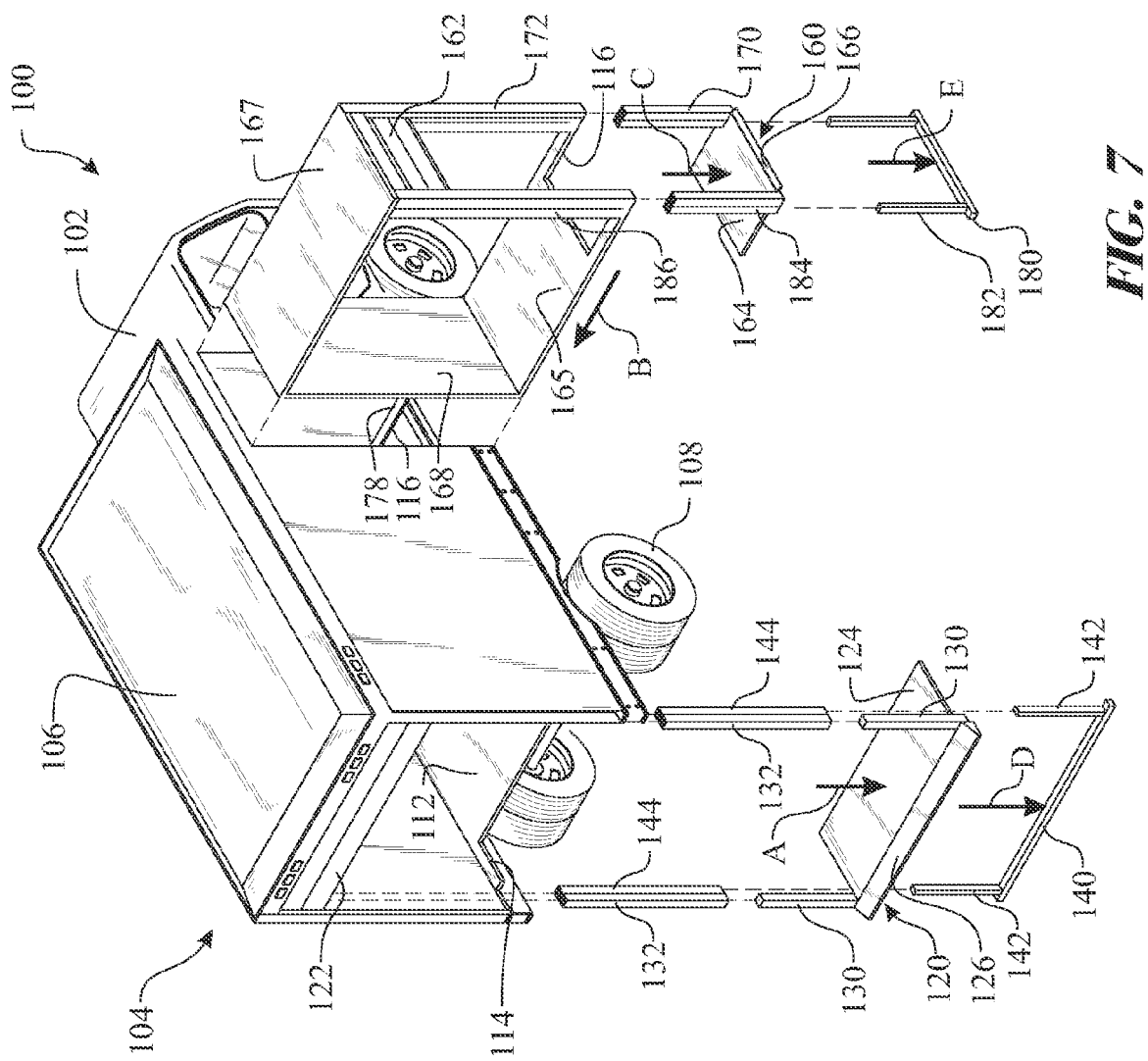
FIG. 7 is a perspective exploded view of the cargo vehicle illustrating the components of the present invention.
Figure 9:
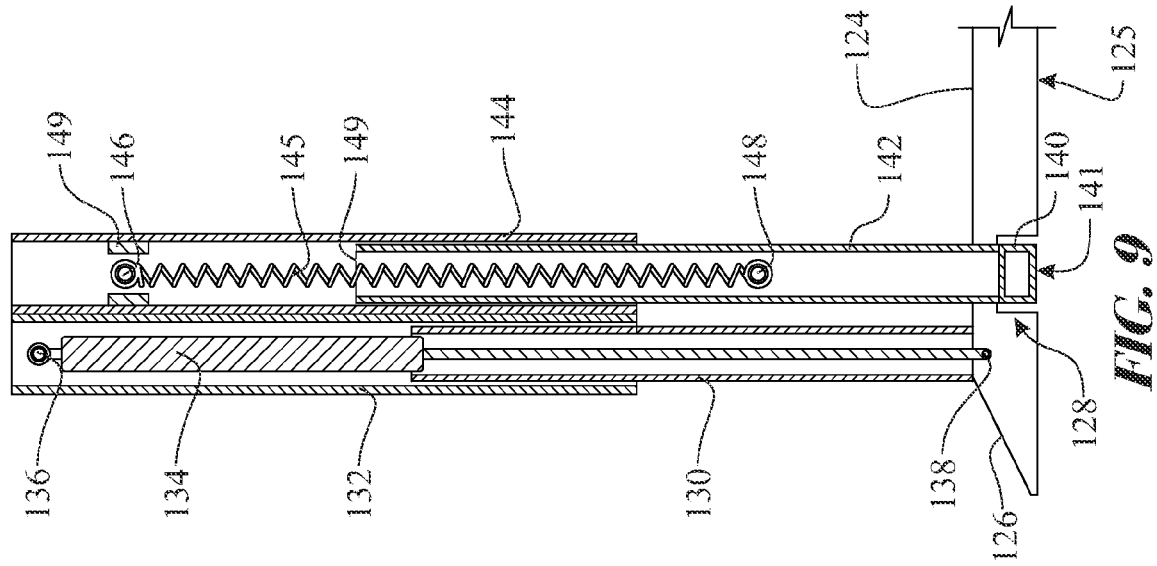
FIG. 9 is a detailed view of an example of the actuator and underride protection of FIG. 9, illustrated having a lift platform in a lowered configuration.
Figure 8:
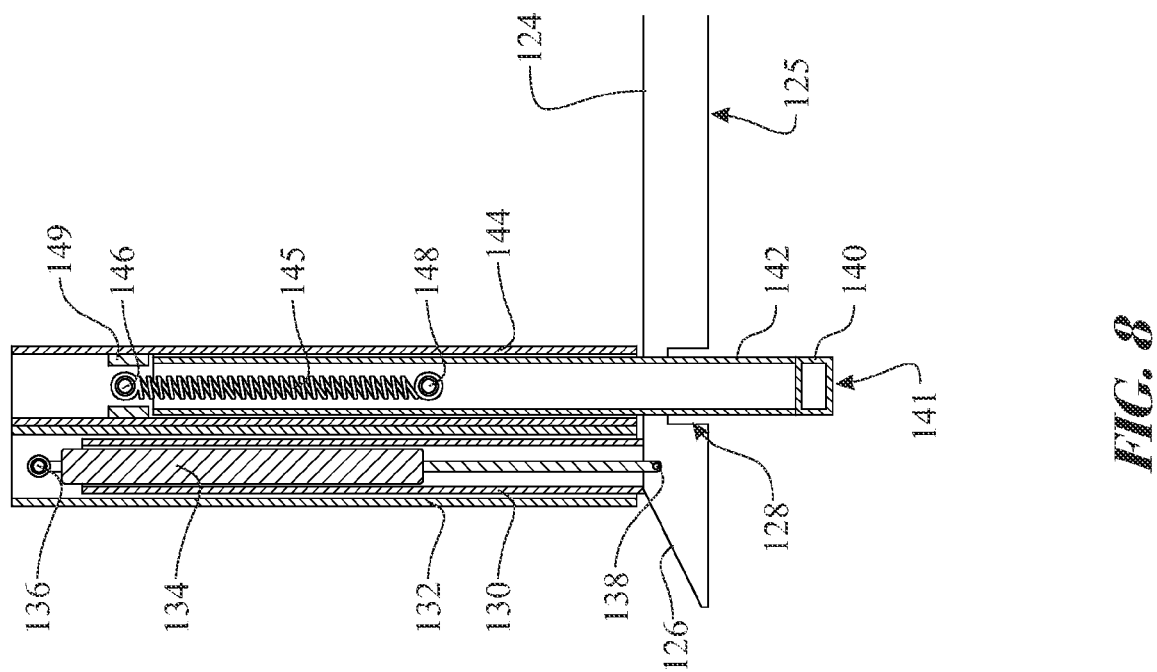
FIG. 8 is a detailed view of an example of an actuator and underride protection, illustrated having a lift platform in a stored configuration.

An overhead-type rear door 122, shown in the open position in FIGS. 4, 5, and 7 and in the closed position in FIG. 1, may completely enclose the trailer body 106, including all of the components of the rear cargo handling apparatus and lift assembly 120. During inclement weather, a movable rear door 122 may be left closed while the rear cargo handling apparatus and lift assembly 120 is loaded with cargo (not shown, but well understood) and then moved downwardly by vertical actuator 134 to the lowered position resting atop the ground or other vehicle support surface, that movement being in the direction of arrow A as illustrated in FIGS. 4 and 5. The rear door 122 may be opened a distance sufficient for removal of the cargo from the movable rear cargo platform 124. Note importantly that, as best seen in the top plan view of FIGS. 3 and 6, the amount of rearwardly space required for loading and off loading of cargo from the trailer body 106 is reduced compared to known lifts. A similar side door 162 can be provided respective to a side cargo handling apparatus and lift module 160.

In one example, an underride member 140 includes spaced underride upright frames 142, which are coupled movably by spring biased coupling member 145 placed within an underride vertical support channel 144, for example. The height and position rearwardly of the trailer body 106 prevent other vehicles from sliding beneath the truck during an unintended rear-end collision with the cargo storing and transport vehicle 100. In one example, underride upright frame 142 may be downwardly deployed (via Arrow D) the underride member 140 upon engagement with the movable rear cargo platform 124, when the movable rear cargo platform 124 is lowered, as disclosed in more detail in reference to FIGS. 8 and 9.

An example of a side cargo handling apparatus and lift module 160 includes an additional feature of a side module movable cargo platform 164 having a side module floor 165, an module back panel 168, two side lift vertical actuator and channels 172 and an module top panel 167. The side cargo handling apparatus and lift module 160 also includes a side module movable cargo platform 164, which, in the upper position, just closely fits within a side module floor cutout 116 so that the side module movable cargo platform 164 is continuous with and uninterruptive of the side module floor 165.

To deploy this side cargo handling apparatus and lift module 160, a track 178 connected within the trailer body 106, in one example, is laterally oriented at approximately the trailer floor level. The track 178 will move the side cargo handling apparatus and lift module 160 outwardly (horizontally) in the direction of arrow B, as best seen in FIGS. 4 and 6. When the side module movable cargo platform 164 clears the longitudinal trailer frame 110, the side module movable cargo platform 164 may be lowered in the direction of arrow C by vertical actuators (similar to vertical actuator 134) contained within the side lift vertical actuator and channel 172 until the side module movable cargo platform 164 comes to rest atop the ground or otherwise. The side lift vertical actuator and channels 172 provide stability, guiding the side upright frame member 170 during vertical motion. Cargo loading and unloading onto or from the interior of the trailer body 106 is facilitated as the side cargo handling apparatus and lift module 160 may be installed anywhere along the length of the trailer and on either side for convenience or special delivery needs. A ramp 166 can be disposed along the outer edge of the side module movable cargo platform 164 for aiding loading and unloading of cargo from the platform 164. The side underride member 180 is partially obscured by the ramp 166 and side module movable cargo platform 164 when the side module movable cargo platform 164 is lowered as illustrated in FIGS. 4 and 5.

A rear impact protection system is integrated with the lift mechanism and illustrated throughout the drawings. Detailed operation sectional views are presented in FIGS. 8 and 9. For example, a underride member 140 is coupled to a movable rear cargo platform 124, which may be raised or lowered, by coupling a underride upright frame 142 to a underride vertical support channel 144 via a spring biased coupling member 145 disposed within the underride vertical support channel 144. Both the underride vertical support channels 144 and the movable rear cargo platform 124 may be mounted to the trailer body 106, 206 of the cargo storing and transport vehicle 100 by vertical actuators 134. The spring biased coupling member 145 is preferably a tension spring secured to the underride vertical support channel 144 via a biasing member channel mount 146 provided at an upper end of the spring biased coupling member 145. The spring biased coupling member 145 is secured to the underride upright frame 142 via a biasing member under ride upright mount 148 provided at a lower end of the spring biased coupling member 145. Each of the vertical actuators 134 may be enclosed within a respective vertical actuator channel 132. The vertical actuator channels 132 are schematically illustrated in the exploded view of FIG. 7, for example, and are illustrated with additional detail in FIGS. 8 and 9. The vertical actuator 134 is secured to the vertical actuator channel 132 via an actuator channel mount 136 provided at an upper end of the vertical actuator 134. The vertical actuator 134 is secured to the movable rear cargo platform 124 or rear upright frame member 130 via a actuator lift mount 138 provided at a lower end of the vertical actuator 134. The vertical actuator 134 is preferably a bi-directional, hydraulically operated piston. Alternates include a screw drive, a cable lift, a rack and pinion lift, an electromechanical lift, and the like. Vertical motion and stability of the movable rear cargo platform 124 is provided via the engagement between the rear upright frame member 130 and the vertical actuator channel 132. A detailed view of two of the underride vertical support channels 144 for one of the underride upright frame 142 shows a spring biased coupling member 145 coupling the underride upright frame 142 to underride member 140. One or more limiting devices 149 may be provided to limit the maximum extent of the movement of the underride upright frame 142 in the upward direction respective to the underride vertical support channel 144. As the movable rear cargo platform 124 moves downward, the underride member 140 may remain stationary until the platform reaches the underride member 140. Then, the movable rear cargo platform 124 and the underride member 140 may continue to move downward together. An underride receiving notch 128 can be provided in a cargo platform bottom surface 125 of the movable rear cargo platform 124 for receiving the underride member 140. This configuration positions a underride member bottom surface 141 of the underride member 140 flush with the cargo platform bottom surface 125, allowing the movable rear cargo platform 124 to be lowered onto the ground. As the movable rear cargo platform 124 is raised upwardly, the underride member 140 may be raised, also, until the underride upright frame 142 reaches the limiting devices 149, for example, which limiting devices 149 positions the underride member 140, at a height to provide for rear impact protection.

A similar underride system can be provided along a side of the vehicle, positioning a side underride member 180 under the side cargo handling apparatus and lift module 160. A pair of side underride upright frames 182 extend upwardly from the two outer ends of the side underride member 180 engaging with a module underride vertical support channel and biasing member 184. The side underride assembly is similar to the rear underride assembly 140, 142, 144 previously disclosed herein. The side underride member 180 adjusts vertically in accordance with Arrow E.

Figure 10:
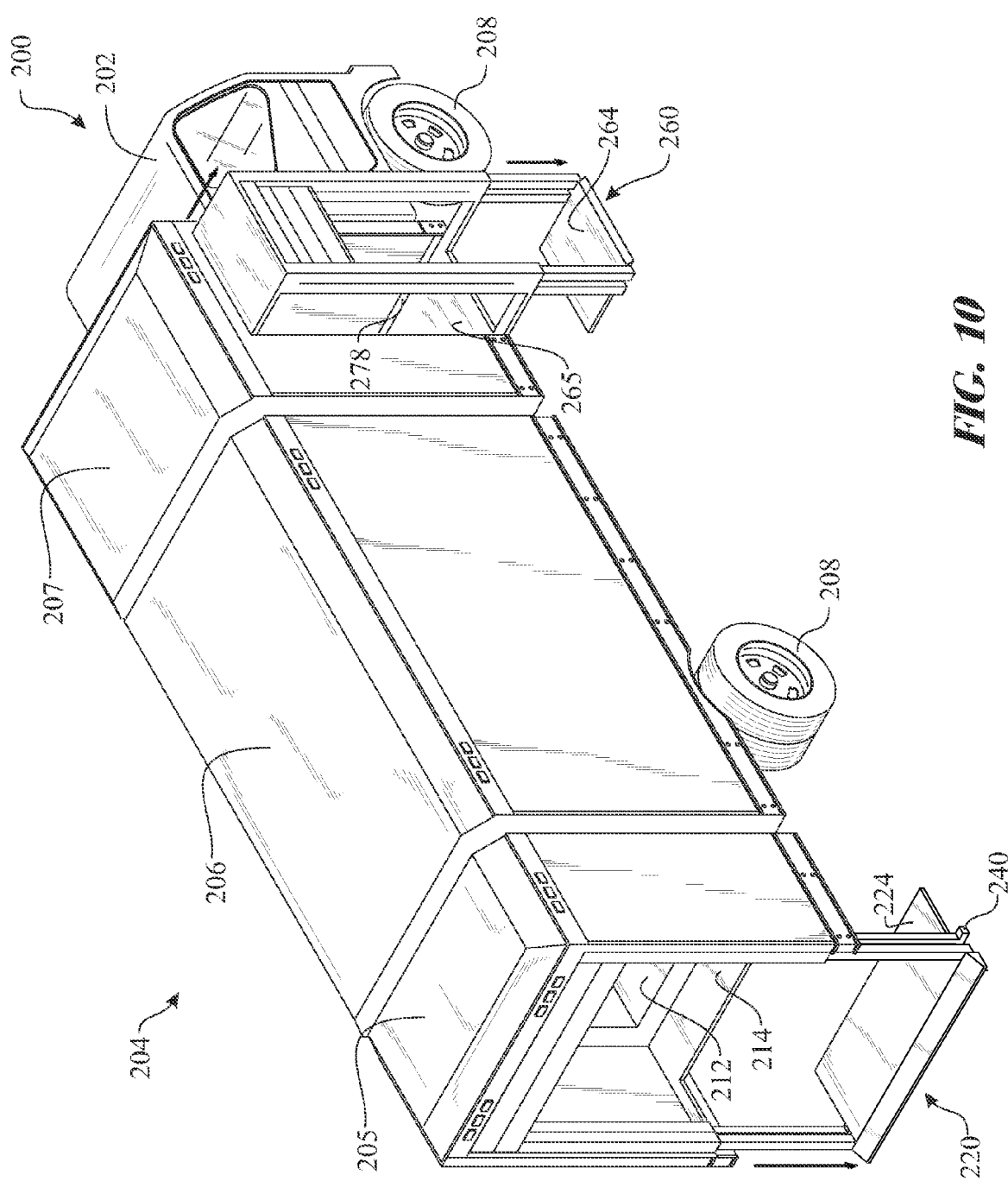
FIG. 10 is a perspective partially exploded view of additional embodiments of the present invention incorporated into trailer modules.

Referring now to FIG. 10, a cargo storage and transport vehicle 200 and includes a truck 202, a frame (not shown, but understood to be similar to longitudinal trailer frame 110), a plurality of wheels 208, and one or more modular lift assemblies 220, 260. The modular lift assembly 220, 260 may be installed within a self-contained, handling add-on module 205, 207 respectively. The rear cargo handling add-on module 205 is assembled about a rear portion of an intermediate trailer section 206. The front cargo handling add-on module 207 is assembled about a forward portion of an intermediate trailer section 206. The rear cargo handling add-on module 205 and the front cargo handling add-on module 207 are independently configured to the intermediate trailer section 206, forming the trailer assembly 204. Operation of each of the lifts 220 and 260 is similar to lifts 120, 160 previously described. The rear cargo handling apparatus and lift assembly 220 comprises a movable rear cargo platform 224, which transports objects between a intermediate trailer floor 212, the module section floor 214, and the ground. The module section floor 214 comprises a cutout which substantially mates with and receives the movable rear cargo platform 224 so that, when the movable rear cargo platform 224 is in the upper position, top-most surface of the movable rear cargo platform 224 is substantially continuous with and uninterrupting with the cutout of module section floor 214 so that cargo within the rear cargo handling add-on module 205 may be slid onto or from the movable rear cargo platform 224 without the need for lifting or use of a wheeled cart or hand truck, for example. Similarly, the side cargo handling apparatus and lift module 260 comprises a side module movable cargo platform 264, which transports objects between a side module floor 265 and the ground. The side cargo handling apparatus and lift module 260 additionally incorporates a track 278 for horizontally transporting the module. The side module floor 265 is substantially continuous with and uninterrupting with the respective module floor (not shown) of the front cargo handling add-on module 207 or the intermediate trailer floor 212. The side module floor 265 comprises a cutout which substantially mates with and receives the side module movable cargo platform 264 so that, when the side module movable cargo platform 264 is in the upper position, top-most surface of the side module movable cargo platform 264 is substantially continuous with and uninterrupting with the cutout of the side module floor 265 so that cargo within the front cargo handling add-on module 207 may be slid onto or from the side module movable cargo platform 264 without the need for lifting or use of a wheeled cart or hand truck. The modularity may be used for any cargo truck. Refrigerated cargo spaces may benefit from an interlock or curtain that reduces the amount of cooled air that escapes from the cargo enclosure during loading and off-loading.

While a number of exemplary aspects and embodiments have been discussed above those of ordinary skill in the art will recognize certain modifications, permeations and additions and sub combinations thereof, which are included within the scope of the present inventions, as claimed.

What is claimed is:

1. A cargo truck having an underride, a cargo floor, and a lift assembly, the underride comprising:
    a generally horizontally disposed underride member;
    a pair of vertically disposed upright frame members, one frame member extending upwards from each of two outer ends of the underride member;
    a pair of underride vertical support channels secured to one of the lift assembly and the cargo truck; and a spring biased coupling member;
    wherein:
        the underride member is positioned proximate and parallel to a peripheral edge of the cargo truck and vertically positioned between a lower edge of the cargo truck and a ground providing a barrier from other vehicles encroaching under the cargo truck;
        the vertically disposed upright frame members are in vertical communication with the underride vertical support channels, allowing for vertical motion; and
        a first end of the spring biased coupling member being affixed to the vertically disposed upright frame member and a second end of the spring biased coupling member being affixed to the underride vertical support channel, the spring biased coupling member controlling the vertical motion of the underride member; and
    the lift assembly further comprising a movable cargo platform such that when the movable cargo platform is lowered, the underride member moves downward when engaged by a lower surface of the movable cargo platform,
    wherein the spring biasing coupling member is coupled between the vertically disposed upright frame member and the underride vertical support channel such that when the cargo platform is raised, the underride member is raised by the biasing mechanism.

2. A cargo truck as recited in claim 1, wherein the underride vertical support channels are assembled to the lift assembly.

3. A cargo truck as recited in claim 2, wherein the underride member is positioned below the lift assembly.

4. A cargo truck as recited in claim 3, the lift assembly further comprising an underride receiving notch for receiving the underride member, allowing a bottom of the lift assembly to seat flush with a ground surface.

5. A cargo truck as recited in claim 1, the lift assembly comprising a moveable cargo platform that moves substantially vertically.

6. A cargo truck as recited in claim 5, wherein the vertical motion of the moveable cargo platform is accomplished via one of the following vertical actuators:
    a. a hydraulic piston,
    b. a screw drive,
    c. a cable drive,
    d. a rack and pinion drive, and
    e. an electromechanical device.

7. A cargo truck as recited in claim 5, the cargo floor further comprising a cutout which follows an outline of the movable cargo platform, wherein the movable cargo platform forms a separate continuation of a surface of the cargo floor and being generally continuous with the floor surface when said cargo platform is in an upper position, whereby cargo may be slid between the trailer-floor surface and said cargo platform.

8. A cargo truck having a lift and underride combination and a cargo floor, the lift and underride combination comprising:
    a lift comprising a movable cargo platform and a vertical control apparatus for operably controlling a lifting and a lowering of the movable cargo platform;
    a generally horizontally disposed underride member; a pair of vertically disposed upright frame members, one frame member extending upwards from each of two outer ends of the underride member;
    a pair of underride vertical support channels secured to one of the lift assembly and the cargo truck;
    a spring biased coupling member;
    wherein:
        the underride member is positioned proximate and parallel to a peripheral edge of the cargo truck and vertically positioned between a lower surface of the platform and a ground providing a barrier from other vehicles encroaching under the cargo truck;
        the vertically disposed upright frame members are in vertical communication with the underride vertical support channels, allowing for vertical motion;
        a first end of the spring biased coupling member being affixed to the vertically disposed upright frame member and a second end of the spring biased coupling member being affixed to the underride vertical support channel, the spring biased coupling member controlling the vertical motion of the underride member; and when the movable cargo platform is lowered, the underride member moves downward when engaged by a lower surface of the moveable cargo platform, the spring biasing mechanism is coupled between the vertically disposed upright frame member and the underride vertical support channel such that when the moveable cargo platform is raised, the underride member is raised by the biasing mechanism.

9. A cargo truck as recited in claim 8, wherein the underride vertical support channels are assembled to the lift assembly.

10. A cargo truck as recited in claim 8, the lift assembly further comprising an underride receiving notch for receiving the underride member, allowing a bottom of the lift assembly to seat flush with a ground surface.

11. A cargo truck as recited in claim 8, the moveable cargo platform moves substantially vertically.

12. A cargo truck as recited in claim 11, wherein the vertical motion of the moveable cargo platform is accomplished via one of the following vertical actuators:
  a. a hydraulic piston,
  b. a screw drive,
  c. a cable drive,
  d. a rack and pinion drive, and
  e. an electromechanical device.

13. A cargo truck as recited in claim 11, the cargo floor further comprising a cutout which follows an outline of the movable cargo platform, wherein the movable cargo platform forms a separate continuation of a surface of the cargo floor and being generally continuous with the floor surface when said cargo platform is in an upper position, whereby cargo may be slid between the trailer-floor surface and said cargo platform.

14. A cargo truck having an underride, a cargo floor, and a lift assembly comprising:
  a generally horizontally disposed underride member;
  a pair of vertically disposed upright frame members, one frame member extending upwards from each of two outer ends of the underride member;
  a pair of underride vertical support channels secured to one of the lift assembly and the cargo truck;
  and a biased coupling member;
  wherein:
    the underride member is positioned proximate and parallel to a peripheral edge of the cargo truck and vertically positioned between a lower edge of the cargo truck and a ground providing a barrier from other vehicles encroaching under the cargo truck;
    the vertically disposed upright frame members are in vertical communication with the underride vertical support channels, allowing for vertical motion;
    a first end of the biased coupling member being affixed to the vertically disposed upright frame member and a second end of the biased coupling member being affixed to the underride vertical support channel, the biased coupling member controlling the vertical motion of the underride member;
    the lift assembly further comprising a movable cargo platform such that when the movable cargo platform is lowered, the underride member moves downward when engaged by a lower surface of the movable cargo platform; and
    wherein the biasing mechanism coupled between the vertically disposed upright frame member and the underride vertical support channel such that when the cargo platform is raised, the underride member is raised by the biasing mechanism.

15. A cargo truck as recited in claim 14, the underride further comprising a limiting device, wherein the limiting device limits an upward motion of the vertically disposed upright frame members defining a vertical position of the underride member respective to the bottom surface of the platform.

16. A cargo truck as recited in claim 14, the underride further comprising a limiting device, wherein the limiting device being affixed to the underride vertical support channels, limiting an upward motion of the vertically disposed upright frame members.

17. A cargo truck as recited in claim 14, wherein the underride vertical support channels are assembled to the lift assembly.

* * * * *